United States Patent
Gujer (10) Patent No.: US 9,267,254 B2
(45) Date of Patent: Feb. 23, 2016

(54) FLOOD PROTECTION SYSTEM

(71) Applicant: Rudolf Heinrich Gujer, Netanya (IL)

(72) Inventor: Rudolf Heinrich Gujer, Netanya (IL)

(*) Notice: Subject to any disclaimer, the term of this patent is extended or adjusted under 35 U.S.C. 154(b) by 0 days.

(21) Appl. No.: 14/396,412

(22) PCT Filed: Apr. 24, 2013

(86) PCT No.: PCT/IB2013/053246
§ 371 (c)(1),
(2) Date: Oct. 23, 2014

(87) PCT Pub. No.: WO2013/160852
PCT Pub. Date: Oct. 31, 2013

(65) Prior Publication Data
US 2015/0117952 A1    Apr. 30, 2015

Related U.S. Application Data (60) Provisional application No. 61/637,497, filed on Apr. 24, 2012.

(51) Int. Cl.
| | | |
|---|---|---|
| E02B 7/28 | (2006.01) |
| E02B 8/00 | (2006.01) |
| E02B 7/50 | (2006.01) |
| E02B 3/10 | (2006.01) |
| E04H 9/14 | (2006.01) |
| E02B 7/36 | (2006.01) |

(52) U.S. Cl.
CPC . *E02B 7/50* (2013.01); *E02B 3/104* (2013.01); *E02B 7/28* (2013.01); *E02B 7/36* (2013.01); *E02B 8/00* (2013.01); *E04H 9/145* (2013.01)

(58) Field of Classification Search
CPC ............. E02B 3/104; E02B 7/28; E02B 7/36; E02B 7/50; E02B 8/00; E04H 9/145
See application file for complete search history.

(56) References Cited

U.S. PATENT DOCUMENTS

| | | | | | |
|---|---|---|---|---|---|
| 3,354,655 | A | * | 11/1967 | Armond | E02B 7/205 405/104 |
| 5,460,462 | A | * | 10/1995 | Regan | E02B 3/104 405/104 |
| 5,725,326 | A | * | 3/1998 | Van den Noort | E02B 3/104 405/103 |
| 6,338,594 | B1 | * | 1/2002 | Adler | B82Y 10/00 405/104 |
| 6,732,479 | B2 | * | 5/2004 | Nomura | E02B 3/102 256/13 |

(Continued)

FOREIGN PATENT DOCUMENTS

| | | |
|---|---|---|
| CN | 102011506 A | 4/2011 |
| DE | 196 51 389 A1 | 6/1998 |

(Continued)

*Primary Examiner* — Benjamin Fiorello
(74) *Attorney, Agent, or Firm* — Vorys, Sater, Seymour & Pease LLP (57) ABSTRACT

Provided is a flood protection system for protecting an area from flooding water, wherein the area includes a trench defined at least along a portion of the boundaries thereof and a at least one depression on the side of the trench facing away from the area to be protected. The system comprising a barrier, configured for being at least partially fitted in the trench; and a float coupled to the barrier and being configured for at least partially is disposed in the depression. The float is configured for rising in response to a rise in the water level inside the depression and about the boundaries of the area. The float is further configured for lifting the barrier out of the trench therewith, thereby blocking the waters from entering the area.

19 Claims, 6 Drawing Sheets

(56) References Cited

U.S. PATENT DOCUMENTS

| | | | | |
|---|---|---|---|---|
| 7,658,572 | B2* | 2/2010 | Miyao | E02B 7/205 405/104 |
| 7,744,310 | B2* | 6/2010 | Alpern | E02B 3/104 405/103 |
| 7,972,081 | B2* | 7/2011 | Linares | E02B 3/104 256/13 |
| 2007/0166110 | A1* | 7/2007 | Kenady | B63B 21/50 405/224 |
| 2011/0268506 | A1* | 11/2011 | Thornbury | E02B 3/104 405/118 |
| 2012/0148346 | A1* | 6/2012 | Eftekharzadeh | E02B 3/104 405/92 |

FOREIGN PATENT DOCUMENTS

| | | | |
|---|---|---|---|
| DE | 19651389 A1 * | 6/1998 | ............. E02B 3/104 |
| DE | 101 43 621 A1 | 6/2002 | |
| DE | 203 00 565 U1 | 3/2003 | |
| GB | 2 397 086 A | 7/2004 | |
| GB | 2 456 878 A | 8/2009 | |
| NL | 1000059 C2 | 10/1996 | |
| WO | 2009/145653 A1 | 12/2009 | |

* cited by examiner

FLOOD PROTECTION SYSTEM

FIELD

The presently disclosed subject matter relates to a flood protection system in general and in particular to a system having a barrier for protecting areas and facilities from floods and storms.

BACKGROUND

Floods are caused by variety of factors: heavy rainfall, snowmelt, severe winds over water, unusual high tides, tsunamis. In addition floods can be caused by failure of dams, levees, retention ponds, or other structures that retained the water. Flooding can be exacerbated by increased amounts of impervious surface or by other natural hazards such as wildfires, which reduce the supply of vegetation that can absorb rainfall.

Periodic floods occur on many rivers, forming a surrounding region known as the flood plain.

There are known systems for protecting buildings and other areas such as fields, or facilities from the flood. CN102011506A discloses an automatic flood control facility, in particular to an automatic flood control buoyancy device for a building, and belongs to the field of buildings. The flood control buoyancy device is that: surrounding storage trenches are formed on the ground of the building; waterproof layers are arranged on wall surfaces of the storage trenches; waterproof films and buttresses are arranged inside the storage trenches; the waterproof layers are connected with one end of each waterproof film in a sealed mode; and the other ends of the waterproof films are connected with the buttresses in a sealed mode.

DE10143621A1 discloses a wall construction is an integrated closed system. It consists of a vertical wall constructed in a ditch, etc. This is supported by two hydraulic rams. The excavation is connected to the water via a pipe, and during floods, incoming water raises the wall vertically above the area to be protected. When the water level drops, the wall sinks below ground level.

WO09145653A discloses a system for protection of houses against floods is an automated system, being self-activating in the case of floods, where after the floods it returns to the initial position. Immediate beside to the walls, all around the building under protection, there are channels wherein are set barriers—envelopes of water proof material which are stretched on the carriers, where the carriers are fixed to the tube which, together with the floating material, that it is coated with, represents a float, being set at the bottom of the channel. In the case of flood, water passes through the openings, made in the covers of the channel, into the channel wherein are the above mentioned float, which moves up as the level of the water in the channel rises and in such a way the barrier around the building which is under protection against floods, is created.

GENERAL DESCRIPTION

According to an aspect of the presently disclosed subject matter there is provided a flood protection system for protecting an area from flooding water, wherein the area includes a trench defined at least along a portion of the boundaries thereof and a at least one depression on the side of the trench facing away from the area to be protected. The system comprising a barrier, configured for being at least partially fitted in the trench; and a float coupled to the barrier and being configured for at least partially is disposed in the depression. The float is configured for rising in response to a rise in the water level inside the depression and about the boundaries of the area. The float is further configured for lifting the barrier out of the trench therewith, thereby blocking the waters from entering the area.

The flood protection system can further include an anchoring member configured to anchor the barrier to the trench when is the deployed position. The anchoring member can be a chain having a length which is shorter or equal to the height of trench.

The flood protection system can further include a sealing arrangement coupled to the barrier and configured to preclude damaging elements from entering the trench. The sealing arrangement can include an inflatable member configured to be disposed between the barrier and the trench in the retracted position, and to inflate when the barrier is in the deployed position such that sealing engagement between the barrier and a wall of the trench is maintained.

The fluid barrier is a foldable barrier which can include two or more profiles telescopically coupled to one another. The two or more profiles can be configured to extend upwardly out of the trench in the deployed position, and to nest inside one another inside the trench in the retracted position. The two or more profiles can include an interlocking arrangement configured to maintain the engagement thereof with one another in the deployed position. The interlocking arrangement can include a bearing member protruding inwardly from an inner surface of a first profile of the two or more profiles, and can be configured in the deployed position to bear against a corresponding bearing member protruding outwardly from an outer surface of a second profile of the two or more profiles. The two or more profiles can further include a sealing element disposed therebetween. The float can be coupled to the first profile.

The flood protection system can further comprise one or more reinforcing members configured to be mounted on the side of the trench facing the area to be protected, and further configured for reinforcing the barrier when in the deployed position. The one or more reinforcing members can be in the form of pillars configured to be upwardly disposed and mounted to the ground adjacent the trench.

The flood protection system can further include a covering plate for covering the barrier when inside the trench in the retracted position. The covering plate is further configured to cover the float when inside the depression in the retracted position. The covering plate can be provided with a locking mechanism configured for locking thereof and for automatically releasing thereof in response to a flood. The covering plate can be spring biased.

According to another aspect of the presently disclosed subject matter there is provided a method for protecting an area from flood water. The method includes forming a trench at least alongside a portion of the boundaries of the area, forming at least one depression outside the area and adjacent the trench, on the side thereof facing away from the area; disposing a barrier at least partially inside the trench; and at least partially fitting a float coupled to the barrier within the depression.

The float is configured for rising in response to a rise in the water level inside the depression and about the boundaries of the area. The float is further configured for lifting the barrier out of the trench therewith, thereby blocking the waters from entering the area.

The method can further includes mounting an anchoring member to the trench, the anchoring member is configured to anchor the barrier to the trench when is the deployed position.

The anchoring member can be a chain having a length which is shorter or equal to the height of trench.

The method can further includes coupling a sealing arrangement to the barrier, the sealing arrangement is configured to preclude damaging elements from entering the trench.

The method can further comprise mounting one or more reinforcing members on the side of the trench facing the area to be protected, the one or more reinforcing members are configured for reinforcing the barrier when in the deployed position. The one or more reinforcing members are in the form of pillars upwardly disposed and mounted to the ground adjacent the trench.

The method can further comprise providing a covering plate for covering the barrier when inside the trench in the retracted position.

The covering plate can further be configured to cover the float when inside the depression in the retracted position. The covering plate can be provided with a locking mechanism configured for locking thereof and for automatically releasing thereof in response to a flood.

Any one or more of the following features and designs can be configured in the flood protection system and the method, according to the presently disclosed subject matter, individually or in combinations thereof:

The barrier is made of a rigid material.
The barrier is a U-shaped profile.
The barrier includes a flat top surface.
The float can be an elongated member configured to lift an entire portion of the barrier.
The float includes a series of floats each coupled to a segment of the barrier and configured for lifting the segment.
The flood protection system further comprise a deployment mechanism configured for lifting the barrier in response to a wind storm.
The barrier is flash with the ground level when in the retracted position.
The barrier has a shape configured in accordance with the required protection when in the deployed position.
The barrier has a foldable barrier.
The foldable barrier includes two or more profiles telescopically coupled to one another.

According to another aspect of the presently disclosed subject matter there is provided a covering assembly for a flood protection system having a barrier disposed at least alongside a portion of the boundaries of an area and is configured for rising in response to a rise in the water level about the boundaries of the area above a predetermined threshold. The assembly includes a covering plate for covering the barrier when the water level is below the threshold; a locking mechanism configured to shift between a first position wherein the covering plate is locked in place and a second position wherein the covering plate is released thereby allowing the barrier to rise. The locking mechanism is shifted from the first position to the second position upon a rise in the water level around the portion of the boundaries beyond the threshold.

The covering plate can be further configured to cover a float coupled to the barrier, wherein the float is configured to rise in response to a rise in the water level and lift the barrier therewith. The covering plate can be configured to cover a trench in which the barrier is disposed in a retracted position thereof. The covering plate can be further configured to cover a depression defined adjacent the trench, the depression is configured to hold the float in the retracted position.

The covering plate can be spring biased such that it is configured to uncover the barrier upon shifting of the locking mechanism form a first position. The locking mechanism can includes an actuator for shifting thereof to the second position in response to a wind storm. The covering plate can be configured to be flash with the ground about the trench when the barrier is disposed in a retracted position thereof.

The locking mechanism can include a housing having a triggering float pivotally mounted therein and is coupled to a stop member, the stop member engages in the first position a sliding pin configured to hold the cover in place. In the second position the triggering float pivots thereby the stop member disengages the sliding pin, which is configured to slid away from the covering plate. The housing can include an inlet configured to allow water to enter therein only after the water level about the boundaries of the area reach the threshold.

The term barrier as used herein the specification and claims denotes any element having a surface which is capable for blocking fluids, such water, any other forms of liquids, blocking objects such as snow, ice, mud, rocks, pebbles and the like.

The term flood as used herein the specification and claims denotes any flow of material or objects, such as rain water, overflowing rivers, and water caused by tsunami, oil from oil leaks, or any other flow of liquids, as well as a flow of objects such as snow, ice, mud, rocks, pebbles and the like.

BRIEF DESCRIPTION OF THE DRAWINGS

In order to understand the disclosure and to see how it may be carried out in practice, embodiments will now be described, by way of non-limiting example only, with reference to the accompanying drawings, in which.

DETAILED DESCRIPTION OF EMBODIMENTS

Figures 1A, 1B, 1C, 1D:
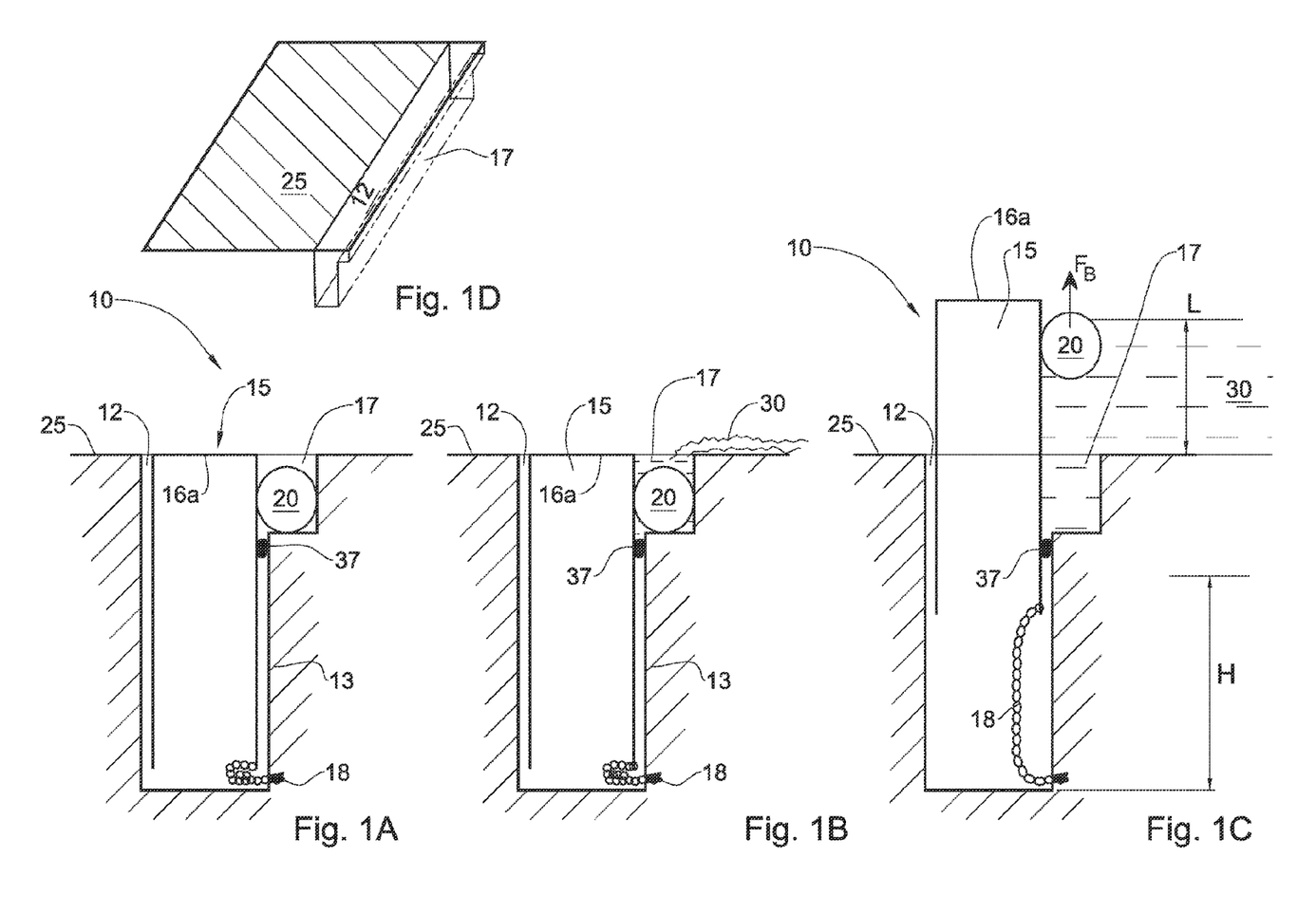
FIG. 1A is a side sectional view of the flood protection system, in accordance with an example of the presently disclosed subject matter, in the retracted position thereof.
FIG. 1B is a side sectional view of the flood protection system of FIG. 1A, when water beginning to rise thereabout.
FIG. 1C is a side sectional view of the flood protection system of FIG. 1A, in the deployed position thereof.
FIG. 1D is a side perspective sectional view of the trench and depression in which the flood protection system of FIG. 1A, is inserted.

FIGS. 1A to 1C illustrate an example of a flood protection system generally designated 10 for protecting an area 25 from water 30 of a potential flood. The area 25 can be a house, building, a field, terrain etc., and includes a trench 12 defined at least along a portion of the boundaries 35 of the area to be protected. The flood protection system 10 includes a barrier 15 which is configured for substantially preventing water, or other fluids, from passing therethrough. The barrier is selectively shifted between a retracted position, shown in FIG. 1A, in which it is at least partially fitted within the trench 12, and a deployed position, shown in FIG. 1C, in which it is extended out of the trench 12 and, thereby blocking water 30 from entering the area 25. The barrier can be configured to withstand the pressure of the flooding fluids, as well as other objects arriving with the fluids, such as rocks, debris etc.

According to the illustrated example, the barrier 15 is lifted to the deployed position by means of a float 20 which is coupled thereto. The float 20 is configured for rising in response to a rise in the water level and for lifting the barrier 15 out of the trench 12 therewith, thereby blocking the fluids from entering the area. It is appreciated that the height of the barrier 15 can be set in accordance with the required height of protection when in the deployed position, which is typically determined in accordance with the highest expected water level in a case of a water flood.

The barrier can be configured to withstand floods which contain heavy objects, such as mud, sand, debris, etc. For example the barrier 15 can be made of a rigid material having a shape and thickness such that the barrier is not easily damaged or deformed. According to the illustrated example, the barrier is a U-shaped profile, and can include reinforcing elements, such as ribs and grooves defined thereon. It is appreciated that the U-shaped profile can be made such that lifting thereof in the deployed position can overcome obstacles, such as weeds, roots, pebbles and rocks. For example, the top portion of the U-shaped profile can be such that all the obstacles thereon are removed, thereby allowing the barrier to rise in the even of a flood.

According to an example, the barrier 15 is disposed inside the trench 12 such that, when the flood protection system 10 is in its retracted position, the top portion of the barrier is flush with the ground 26. This way the barrier is protected from damage, and does not constitute an obstacle during normal use of the area 25.

The float 20 is made of a floating material such as an outer shell filled with air or gas, Styrofoam, etc., which, when buoyancy forces are exerted thereon, is configured to lift the barrier 15 therewith. It is appreciated that the size and characteristics of the float 20 can be determined in accordance with the weight of the barrier 15 to be lifted therewith. Accordingly, the float 20 can be an elongated member configured to lift an entire portion of the barrier 15. Alternatively, the float 20 can include a series of floats each coupled to a segment of the barrier 15, such as described in detail with respect to FIG. 3A.

According to the present example, the float 20 in the retracted position is fitted inside a depression 17 adjacent the trench 12, on the side thereof facing outside the area 25. This way, the float in the retracted position is protected, and does not constitute an obstacle around the area 25. Although the depression 17 is illustrated here as being integrally formed with the trench, it is appreciated that the depression can be formed separated from the trench 12. In that case, both walls of the trench and the barrier are substantially flash with the ground level, such that when in the retracted position people can walk by without being disturbed by the trench, the barrier or the float.

It is further appreciated that the depression 17 need not be defined alongside the entire length of the trench, as shown in FIG. 1D, but rather can be defined in such a way so as to allow the float 20 to be received therein. That is to say, the length of the depression 17 is such which allows the float 20 to be seated therein when the system 10 is in its retracted position. In addition, in case the float 20 includes more than one float, such as a series of floats each coupled to a segment of the barrier 15, the depression 17 also includes a plurality of depressions defined at locations corresponding to each of the floats, each configured to receive at least one float 20 therein. Such an example is described hereinafter, with reference to FIG. 2C.

It is appreciated that the trench 12 and/or the depression 17 can be defined in the ground surrounding the area to be protected. The ground can be soil, floor tiles, concrete, or any elevated portion defined along the boundaries of the area. In addition, the trench 12 and the depression 17 can include supporting elements, for supporting the walls thereof, for example by integrally forming them in a concrete floor. Alternatively, the trench and depression can be formed by digging them in the ground and by inserting rigid walls made of plastic, metal or wood walls therein so as to support the inner shape thereof.

According to an example, the trench 12 includes a sealing arrangement such as a seal 37 configured to preclude fluids from entering therein. This way, water 30 from the flood enters only the depression 17 thereby causing the elevation of the float 20, however not entering the trench 12. Thus, the seal 37 substantially maintains the trench 12 clean of mud, debris, and other elements which may cause damage to the system 10, for example by blocking the barrier 15 from moving in and out of the trench to the retracted or deployed positions, respectively. The seal 37 according to the illustrated example is disposed between the barrier 15 and a wall of the trench 12, at least along the wall 13 thereof facing away from the area 25 to be protected. This way water from the direction which the flood is expected to arrive, cannot enter the trench 12. It is appreciated that the sealing arrangement is configured such that it enables displacement of the barrier 15 inside the trench 12. It is further appreciated that the sealing arrangement can be made such that only the majority of the water or the dirt from the flood reaching the outside areas of the trench 12 do not enter therein, thereby allowing the barrier to freely displace therein. Alternatively, the sealing arrangement can be configured to substantially preclude any water from reaching the area 25 to be protected, for example, underneath the barrier when in the deployed position, through the trench 12.

According to an example, the barrier 15 is anchored to the trench wall by an extendable anchoring member 18, i.e. a chain, a rope, a cable and the like. This can be carried out for example, by attaching a first end of the anchoring member 18 to the barrier 15 and a second end thereof to the bottom of the trench 12. The anchoring member 18 is configured to allow the barrier 15 to upwardly extend out of the trench 12, in response to rising water, while not completely being removed therefrom. This way the barrier can fully extend in the deployed position, however, retaining the engagement with the trench thereby blocking water from entering therebetween, and reaching the area 25. The anchoring member 18 can be a chain having a length, here denoted by H, which is shorter or equal to the height of trench 12. In fact, in order to ensure that water do not enter the trench 12, the length of the chain can be slightly shorter than the height of the trench, thus allowing the seal 37 to provide a continuous sealing engagement between the a wall 13 of the trench 12 and the barrier 15.

Reference is now made to FIG. 1A, during normal situation the system 10 is in the retracted position, wherein the barrier 15 is seated inside the trench 12, and the float 20 is seated inside the depression 17. According to the illustrated example, both the barrier 15 and the float 20 are fully disposed within the trench 12 and the depression 17, respectively, thus, people, vehicle, or animals can pass in and out of the area 25, around the system 10 without bumping into the barrier 15 or the float 20. The barrier 15 can be made with a flat top surface 16a, substantially covering the entire opening of the trench 12, similarly, the float 20 can be made with a flat top surface substantially covering the entire opening of the depression (not show). This way, in the retracted position, the system 10 is flush with the ground level thereabout, allowing people to walk by without tripping inside the trench 12.

As illustrated in FIG. 1B water 30, for example form a flood, reaches the depression 17, and enters therein, thereby causing the float to be lifted upwardly. Water 30, however, does not enter the trench 12 due to the seal 37 disposed at the top of the trench wall 13.

As shown in FIG. 1C, as the flooding water rises higher, for example to the level L, the float 20 is lifted to substantially same height by a buoyancy force here denoted by $F_B$. Since the float 20 is coupled to the barrier 15, buoyancy force $F_B$ applies also to the barrier 15, which is lifted with the float 20 to the same height, to the deployed position, thereby blocking the water 30 from reaching the area 25.

The barrier 15 can keep rising in response to rising water, until reaching its maximum deployment, at which point the anchoring member 18 holds the barrier 15, and prevent it from further rising completely out of the trench 12. Since in such a situation water can rise above the barrier 15 thereby reaching the area 25, the height of the maximum deployment of the barrier is set in accordance with the expected maximum water level. The height of the barrier can include an additional safety margin above the height of the expected water level.

As the water level goes down the barrier 15 and the float 20 gravitate back into the trench 12 and the depression 17. When water is completely eliminated from around the area 25 the system 10 goes back to its retracted position, and the barrier 15 is fully disposed inside the trench 12.

Figure 2A:
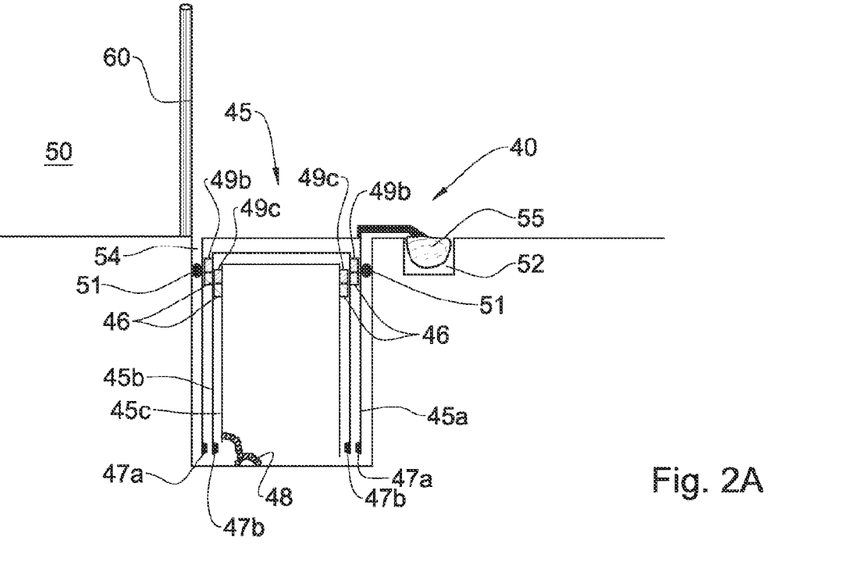
FIG. 2A is a side sectional view of the flood protection system, in accordance with another example of the presently disclosed subject matter, in the retracted position thereof.
Figure 2B:
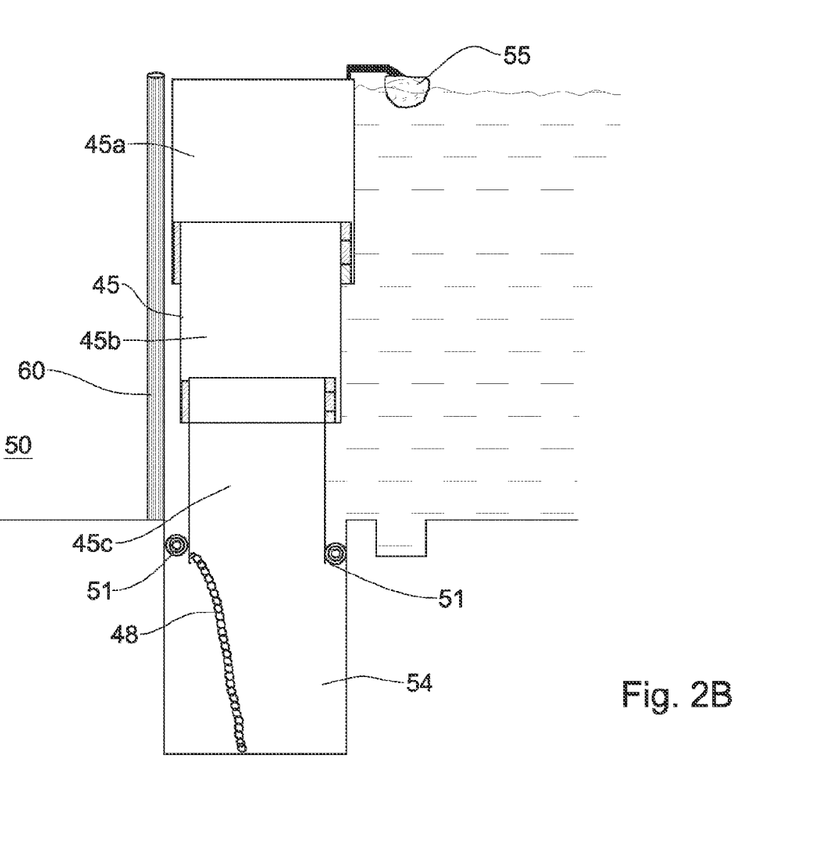
FIG. 2B is a side sectional view of the flood protection system of FIG. 2A, in the deployed position thereof.
Figure 2C:
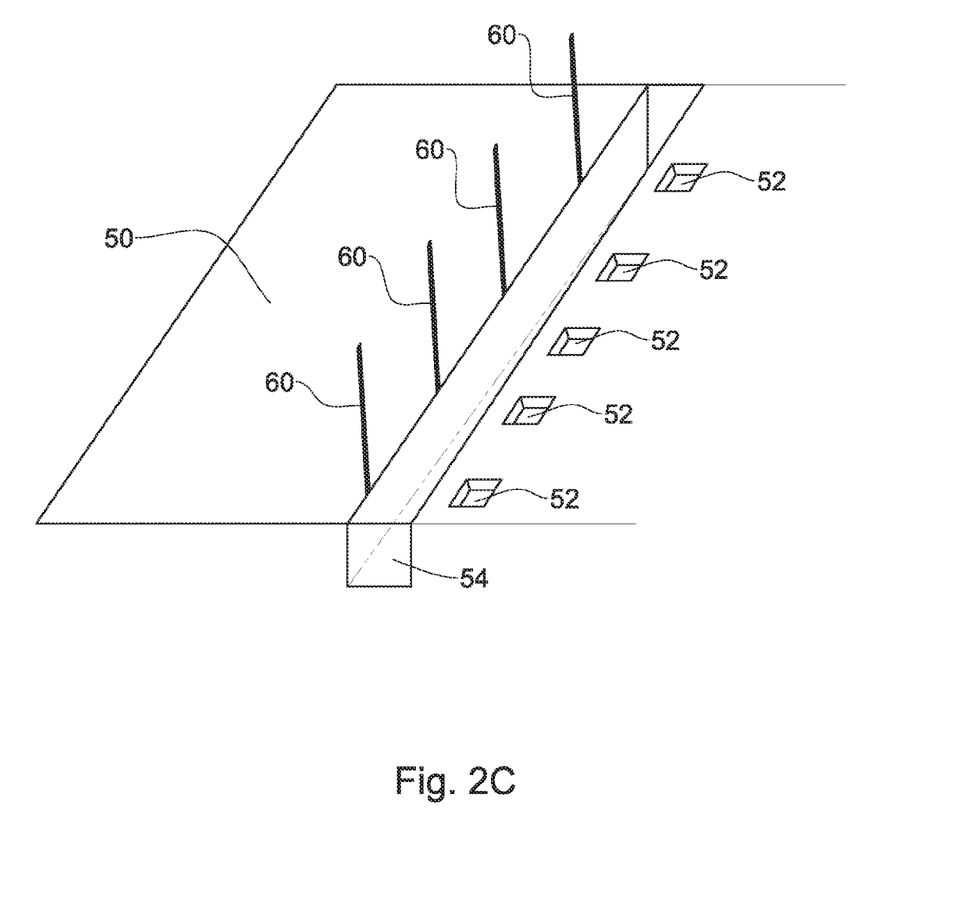
FIG. 2C is a side perspective sectional view of the trench and depression in which the flood protection system of FIG. 2A, is inserted.

Turning now to FIGS. 2A through 2C, there is shown a further example of a flood barrier system 40, being substantially the same as the system 10 of FIG. 1, and includes a barrier 45 configured to protect area 50 from a potential flood. According to this example the barrier is coupled to a series of floats 55 which are adapted to rest in a plurality of depressions 52 in the retracted position, as can most clearly be seen in FIG. 2C. The barrier 45 is an foldable barrier, which in configured to fit and rest in a trench 54 in the retracted position, and to extend therefrom to its full length in the deployed position. Accordingly, the trench 54 can be configured to hold the barrier 45 when folded, and need not be of the size of the barrier in its fully extended position. In addition, this way the barrier 45 can be configured to extend to substantially any height as required.

In the illustrated example, the barrier 45 includes a series of rigid profiles 45a 45b and 45c telescopically coupled to one another, configured to extend upwardly out of the trench 54 in the deployed position, and to nest inside one another inside the trench 54 in the retracted position.

It is appreciated that telescopically coupling the profiles 45a, 45b and 45c can be carried out in a variety of ways, for example, each of the profiles can be a U-shaped profile, disposed up-side down inside the trench 54, such that the opening thereof is facing the trench 54. The first profile 45a being the largest profile, is adapted to receive a second profile 45b therein, which is also adapted to receive a slightly smaller third profile 45c therein. As a consequence, when the barrier 45 is in its retracted position, the profiles 45a, 45b and 45c, are nested and fitted one inside the other, and when the barrier 45 is in its deployed position, the first profile 45a extends upwardly, above second profile 45b, which in return can also extend upwardly above the third profile 45c.

It is appreciated that the profiles 45a to 45c can include an interlocking arrangement which maintains their respective engagement with one another in the deployed position. Thus, the floats 55 can be coupled to the first profile 45a and configured to elevate it when the water level rises, which in turn, due to the interlocking arrangement, is configured to elevate the second profile 45b, which is further configured to elevate the third profile 45c.

For example the first profile 45a can include on at least one side wall thereof a bearing member 47a protruding inwardly from the inner surface thereof, and configured to engage and bear against a corresponding bearing member 49b protruding outwardly from the outer surface of a side wall of the second profile 45b. Similarly, the second profile 45b can include on at least one side wall thereof a bearing member 47b protruding inwardly from the inner surface thereof, and configured to engage and bear against a corresponding bearing member 49c protruding outwardly from the outer surface of a side wall of the third profile 45c. The third profile 45c can be coupled to an anchoring member 48, which is fastened to the bottom of the trench 54.

The telescopic barrier 45 can include sealing elements 46 between the profiles 45a to 45c so as to preclude water from passing therebetween, in the deployed position under a condition of flooding water. The sealing elements can be provided adjacent the bearing members 47a, 47b defined on the inner surface of first and second profiles 45a and 45b, respectively, or on the bearing members 49b and 49c defined on the outer surface of the second and third profiles 45b and 45c, respectively. When the barrier 45 is in the deployed position thereof, the bearing members bear against one another and the sealing element 46 therebetween provides a tight engagement between the profiles 45a, 45b and 45c. In addition, as described hereinabove with regards to the previous example, the barrier is provided with a seal 51 for sealing between the barrier 45 and the trench 54. It is noted that according to the present example the first profile in the deployed position is fully extended out of the trench 54, thus leaving a larger gap between the wall of the trench and the third profile 45c. Thus, the seal 51 in this example can be an inflatable member which is configured to be disposed between the first profile and the trench in the retracted position, and to slightly inflate so as to sealingly engage the third profile 45c when the first and second profiles 45b are fully extended out of the trench 54.

Accordingly, in a condition of a flood, rising waters enter the depression 52 thereby exerting a buoyancy force on the floats 55, which are elevated together with the first profile 45a. The first profile can extend until the bearing member 47a thereof engages the bearing member 49b of the second profile 45b or the seal 46 therebetween. Thus, in case the waters keep rising the first profile 45a can further rise, elevating therewith the second profile 45b. At this point the first and second profiles 45a and 45b can extend until the bearing member 47b of the second profile 45b engages the bearing member 49c of the third profile 45c or the sealing element 46 therebetween. Thus, in case the water level keeps rising the first and second profiles 45a and 45b can further rise, elevating therewith the third profile 45c. The third profile 45c is retained in its place inside the trench by the anchoring member 48. It is appreciated that the barrier can include as many profiles as required in accordance with the expected height of rising water under a condition of a flood.

It is further noted that according to the illustrated example, the system 40 is provided with one or more reinforcing members 60 for providing the barrier 45 with additional reinforcement when in the deployed position. The reinforcing members 60 can be in the form of pillars upwardly disposed and mounted to the ground adjacent the trench 54, on the side thereof facing the area 50 to be protected, and configured to engage the barrier when is extended out of the trench 54. As shown in FIG. 2C, a plurality of reinforcing members 60 can be disposed along the trench 54 in a distance from one another, such that the barrier under the pressure of the rising water can bear against the reinforcing members 60. It is appreciated that the shape, height, and material of the reinforcing members 60 can be selected in accordance with the force expected to be exerted by the rising water, as well as the amount of counter force the barrier 45 can withstand. It is further appreciated that the reinforcing member can be made in any other known way, such as providing an additional profile disposed in diagonal with respect to the pillar so as to provide thereto additional support.

According to an example, the reinforcing members can be configured to be retracted in the ground, and be deployed upwardly at a time of a flood. Deploying the reinforcing members can be carried out by any known means, or by a float such as the float used for lifting up the barrier.

According to one example, there is provided a system for protecting a building or other structures against wind storms such as hurricane tornado etc. The system of protection against wind storm is provided with a barrier which in a retracted position can be stored inside a trench in the ground or a channel defined in a fence or a wall around the building to be protected. The barrier can include one or more profiles which can have a telescopic arrangement for example as described herein above with regards to the FIG. 2A. The barrier is configured to be deployed in a situation of a storm, thereby protecting the building. In order to allow deployment of the barrier there is provided a deployment mechanism, such as a pulley for extending the barrier, with or without a motor.

Alternatively, the barrier can be provided with an inflatable portion configured to be inflated thereby deploying the barrier. The barrier in that case can be provided with means for inflating the inflatable portion, such as a compressor or a pyrotechnic device, such as used to inflate airbags.

The deployment mechanism can be actuated by a user in a time of a storm or can be automatically actuated by an actuator coupled to a warning system, which is configured to detect or notify that such as storm is arriving.

In a further example, there is provided a combined protection system for protection against hurricane and/or flood, where the system includes a float for deploying the barrier in case of a flood, and a deployment mechanism for manually deploying the barrier.

Figure 3A:
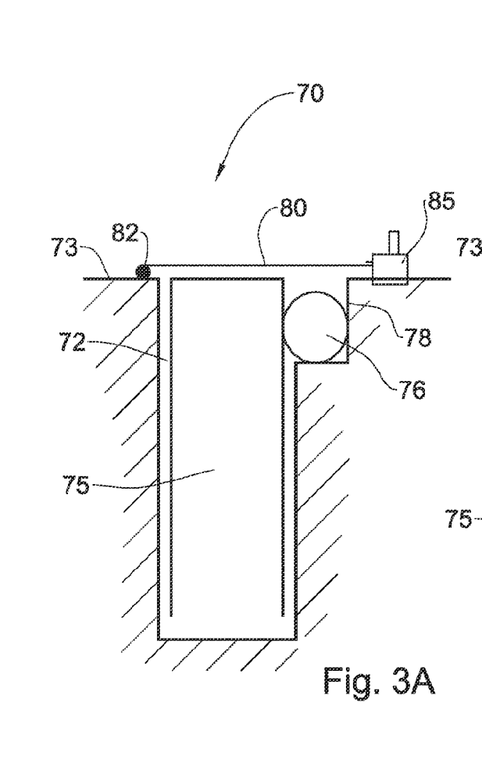
FIG. 3A is a side sectional view of the flood protection system of FIG. 1A, in the retracted position thereof and having a cover thereon.
Figure 3B:
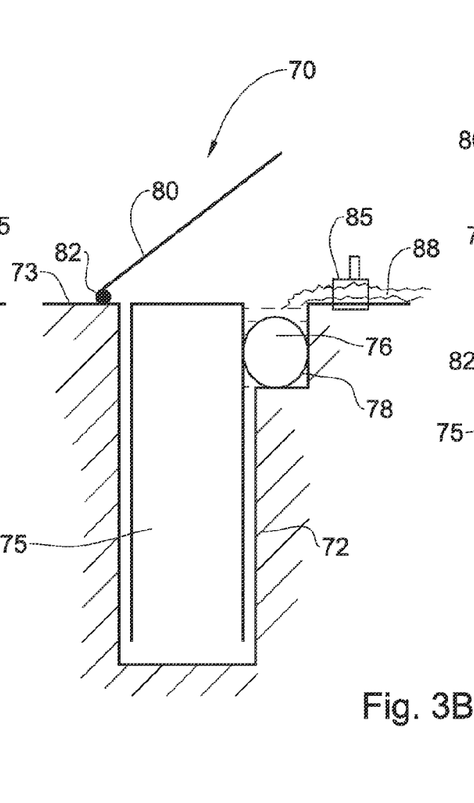
FIG. 3B is a side sectional view of the flood protection system of FIG. 3A, when water beginning to rise thereabout.
Figure 3C:
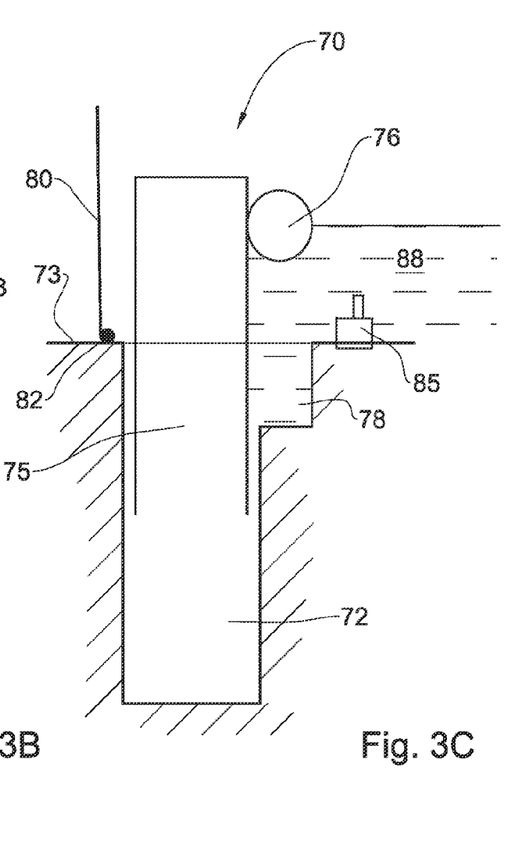
FIG. 3C is a side sectional view of the flood protection system of FIG. 3A, in the deployed position thereof.

Referring now to FIGS. 3A to 3C, in another example of the presently disclosed subject matter there is provided a flood protection system 70 substantially the same as the system 10 of FIG. 1 and including a barrier 75 disposed in a trench 72 in a retracted position and configured to extend therefrom in a deployed position by means of a float 76 disposed in a depression 78, thereby protecting area 73 from a potential flood. According to the illustrated example the system is further provided with a covering plate 80 for covering and protecting the barrier 75 and the float 76 inside the trench 72 and the depression 78, respectively, when in the retracted position. The covering plate 80 is pivotally mounted to the side of the trench 72 by a hinge 82 and can be provided with a locking mechanism 85 configured to lock the covering plate thereby precluding undesirable opening thereof. The locking mechanism can be configured to automatically release the covering plate 80 in response to a flood, for example by means of an electric actuator activated by a remote user, or by any other mechanism such as described herein after with regards to FIGS. 4A and 4B. According to one example the covering plate 80 can be spring biased, for example by a spring (not shown), such that when the locking mechanism 85 releases the covering plate 80, it is urged upwardly by the spring thereby allowing the barrier 75 to freely extend upwardly. The spring can be mounted underneath the covering plate 80 and adjacent the hinge 82, or the hinge itself can be a spring hinge, as known.

As shown in FIG. 3A, during normal use of the area 73, i.e. where there is no flood in the area, the barrier 75 is at least partially disposed inside the trench 72 and the covering plate 80 is placed thereon, thus precluding undesirable objects from entering the trench 72. At this position, the covering plate 80 blocks the barrier 75 from rising out of the trench 72, and according to the illustrated example blocks the float 76 as well form rising out of the depression 78. However, as shown in FIG. 3B, as flooding water 88 arrives to the area of the trench 72, the locking mechanism 85 is activated thereby releasing the covering plate 80, and allowing the float 76 together with the barrier 75 to rise upwardly. Finally, as shown in FIG. 3C, as the water level rises the barrier 75 is urged upwardly by the float 76, thereby blocking the water 88 from entering the area 73. At this position the covering plate 80 is pushed by the barrier 75 to its upmost position. As the water level goes down back to normal the barrier 75 and the float 76 slide back into the trench 72 and the depression 78 respectively, at this position, the covering plate gravitates back on top of the trench 72, and is locked and secured by the locking mechanism 85, either automatically as known, or manually.

Figures 4A, 4B:
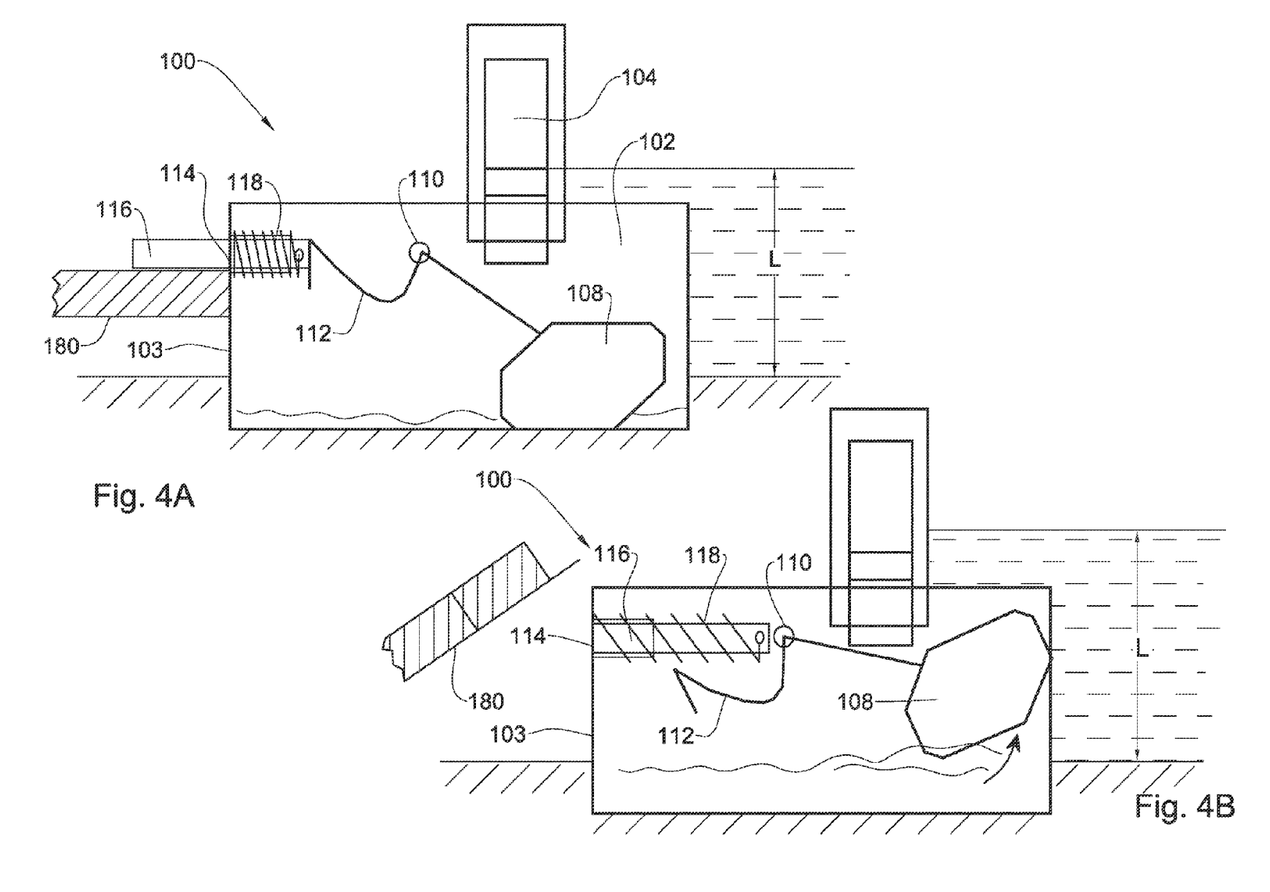
FIG. 4A is a side sectional view of a locking mechanism according to one example of the presently disclosed subject matter, in a first position thereof.
FIG. 4b is a side sectional view of a locking mechanism of FIG. 4A, in a second position thereof.

FIGS. 4A and 4B show an example of a locking mechanism 100. Locking mechanism 100 includes a housing 102 having an inlet aperture 104, and a triggering float 108 pivotally mounted therein about a hinge 110. The triggering float 108 is rigidly coupled to a stop member 112 which pivots up and down about the hinge 110 together with the triggering float 108. The housing 102 further includes a bore 114 in the side wall 103 thereof, in which a sliding pin 116 is disposed. The sliding pin 116 is configured to slide inside the bore 114, such that in a first position it protrudes outwardly from the side wall 103 of the housing 102 to a predetermined distance (shown in FIG. 4A), and in a second position it protrudes outwardly to a second distance, which is less than the protrusion distance of the first position, or does not protrude at all (shown in FIG. 4B). Inside the housing 102 the sliding pin 116 in the first position (shown in FIG. 4A) engages on the one end thereof the stop member 112.

The sliding pin 114 is provided with a spring 118 mounted thereon, which bears on one end thereof against the inner surface of the side wall 103, and on the other end thereof is secured to the pin 116, for example, to a flange formed thereon (not shown). This way, the spring 118 urges the sliding pin 116 toward the inside of the housing 102, however when in the first position (FIG. 4A) the pin 116 is held in its position by the stop member 112.

As the stop member 112 together with the triggering float 108 pivot upwardly or downwardly, the stop member disengages the sliding pin 116 thereby allowing the sliding pin to be urged by the spring 118 toward the inside of the housing into the second position (FIG. 4B).

The locking mechanism 100 is disposed adjacent the covering plate 80 for example (as shown in FIG. 3A), in such as a way that the side wall 103 of the housing 102 faces the covering plate, and the covering plate in the closed position thereof can be disposed underneath the sliding pin 116, when the latter one is in its first position, i.e. protrudes outwardly through the bore 114 to a distance sufficient to lock the covering plate underneath, as shown in FIG. 4A. At this position the triggering float 108 is in its bottommost position, and thus the stop member 112 engages the sliding pin 116 thereby maintaining it protruding outwardly to the distance of the first position.

As the water level outside the housing 102 rises, as shown in FIG. 4B, water enter the housing through the inlet aperture 104, thereby the water level inside the housing rises. In response the triggering float 108 pivots upwardly about hinge 110, thereby causing the stop member 112 to disengage the one end of the sliding pin 116, which is urged inwardly by the spring 118. As a result, the sliding pin 116 is free to slide under the force of the spring 118 to the second position thereof, where it protrudes outwardly to a lesser distance or does not protrude outwardly at all, thereby disengaging the covering plate 80. in this position the covering plate 80 is free to pivot upwardly, for example by means of a spring as described hereinabove or by means of the rising water.

It is appreciated that the water level threshold in which the sliding pin 116 slides inwardly thereby releasing the covering plate 80 can be determined as desired. This is carried out by placing the triggering float 108 in the height above which the rising water level (here denoted as L) will cause the pivot thereof, thereby triggering the system. Alternatively, the threshold can be determined by placing the inlet aperture 104 at a height above which water will start entering the housing thereby triggering the system.

It will be appreciated by those skilled in the art, that this is only one example of a locking mechanism, and that there are numerous other possibilities, including any combination of any one of mechanical, electric, hydraulic, pneumatic, magnetic and any other ways of triggering the system.

According to another example (not shown), the locking mechanism can include a retaining pin mounted to the side of the covering plate and configured to lock it and prevent it from opening. The retaining pin is configured to break upon exertion of upwardly directed forces, form the covering plate. Thus, when water inside the depression and or the trench rise thereby forcing the float and the barrier to rise, the covering plate is upwardly pushed exerting forcing on the retaining pin, until the latter breaks and release the covering plate. It is appreciated that according to this example the retaining pin is replaced in the event of a flood.

According to the latter example, it is appreciated that the cover is provided with an opening or a plurality of apertures allowing water to enter the trench. The cover however is configured to prevent undesirable objects for entering the trench.

Figure 5A:
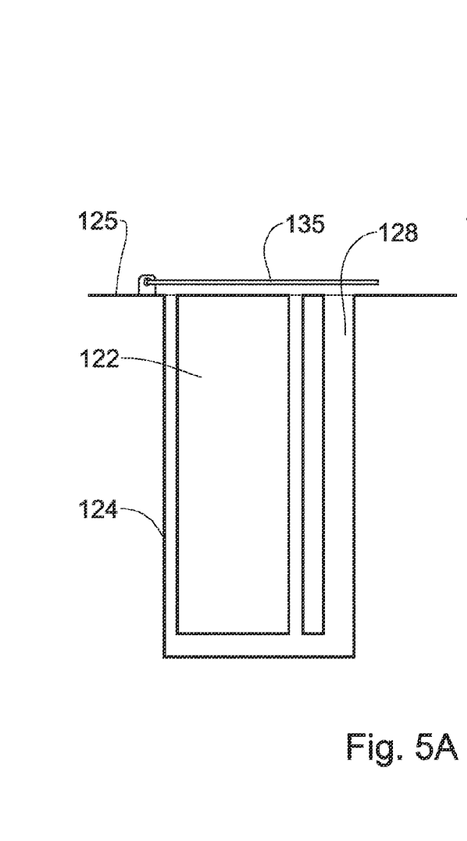
FIG. 5A is a side sectional view of the flood protection system, in accordance with another example of the presently disclosed subject matter, in the retracted position thereof.
Figure 5B:
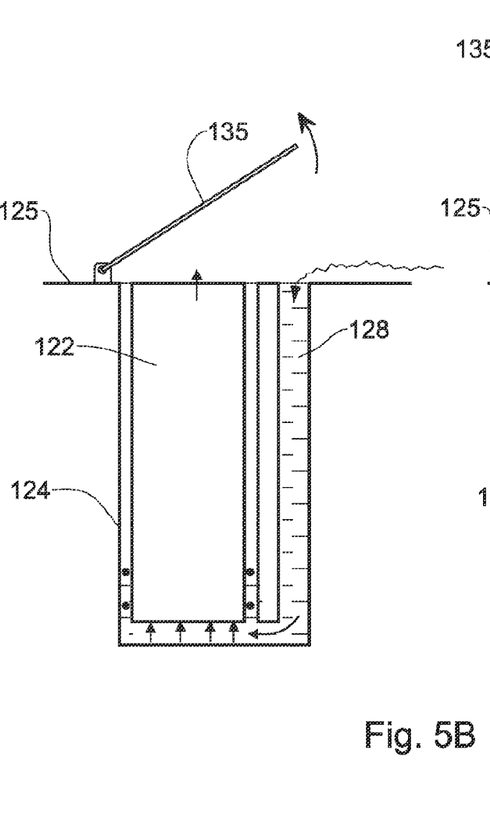
FIG. 5B is a side sectional view of the flood protection system of FIG. 5A, in the deployed position thereof.
Figure 5C:
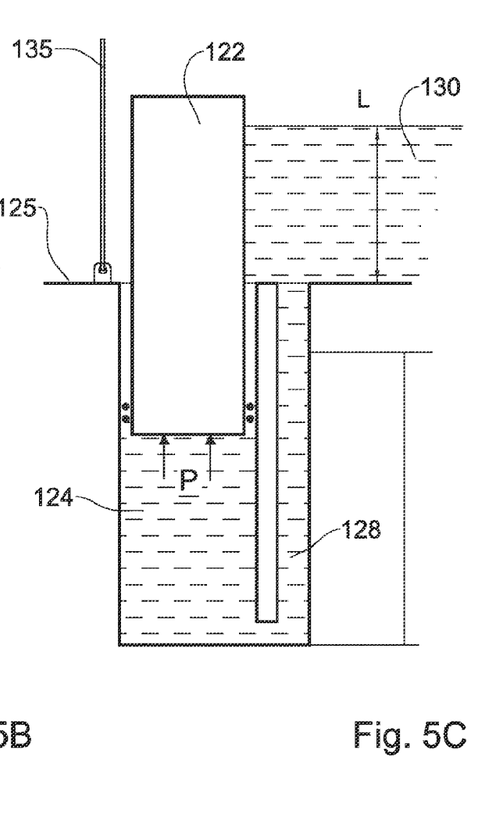
FIG. 5C is a side sectional view of the flood protection system of FIG. 5A, in the deployed position thereof.

Referring now to FIGS. 5A to 5C, in another example of the presently disclosed subject matter there is provided a flood protection system 120 having a barrier 122 disposed in a trench 124 in a retracted position and configured to extend therefrom in a deployed position, thereby protecting area 125 from a potential flood. According to this example the barrier 122 is configured to rise in a response to a hydrostatic forces applied thereto, for example by water 130 from the flood reaching the bottom of the trench 124 through a an inlet channel 128 formed adjacent the trench on the side thereof facing away from the area 125 to be protected.

The system 120 is normally covered by covering plate 135 which is configured to open as the water level around the area rises. The covering plate 135 can be provided with a locking mechanism such which is described with regards to FIGS. 4A and 4B.

Those skilled in the art to which the presently disclosed subject matter pertains will readily appreciate that numerous changes, variations, and modifications can be made without departing from the scope of the invention, mutatis mutandis.

The invention claimed is:

1. A flood protection system for protecting an area from flooding water, wherein the area comprises a trench defined at least along a portion of the boundaries thereof and at least one depression on the side of the trench facing away from the area to be protected, the system comprising:
a barrier, configured for being at least partially fitted in the trench; and
a float coupled to said barrier and being configured for at least partially being disposed in the depression;
wherein said float is configured for rising in response to a rise in the water level inside the depression and about the boundaries of the area and wherein said float is further configured for lifting said barrier out of the trench therewith, thereby blocking the waters from entering the area.

2. The flood protection system according to claim 1, wherein said barrier is made of a rigid material.

3. The flood protection system according to claim 1, wherein said barrier is a U-shaped profile.

4. The flood protection system according to claim 1, wherein said barrier is flush with the ground level when in the retracted position.

5. The flood protection system according to claim 1, further comprising a sealing arrangement coupled to said barrier and configured to preclude damaging elements from entering the trench.

6. The flood protection system according to claim 5, wherein said sealing arrangement comprises an inflatable member being configured to be disposed between said barrier and the trench in the retracted position, and to inflate when said barrier is in the deployed position such that sealing engagement between said barrier and a wall of the trench is maintained.

7. The flood protection system according to claim 1, wherein said barrier is a foldable barrier and wherein said foldable barrier comprises two or more profiles telescopically coupled to one another.

8. The flood protection system according to claim 7, wherein said two or more profiles are configured to extend upwardly out of the trench in the deployed position, and to nest inside one another inside the trench in the retracted position and wherein said two or more profiles comprises an interlocking arrangement configured to maintain the engagement thereof with one another in the deployed position.

9. The flood protection system according to claim 8, wherein said interlocking arrangement comprises a bearing member protruding inwardly from an inner surface of a first profile of said two or more profiles, and configured in said deployed position to bear against a corresponding bearing member protruding outwardly from an outer surface of a second profile of said two or more profiles.

10. The flood protection system according to claim 7, wherein said two or more profiles further comprises a sealing element disposed therebetween.

11. The flood protection system according to claim 10, wherein said float is coupled to said first profile.

12. The flood protection system according to claim 1, further comprising a deployment mechanism configured for lifting said barrier in response to a wind storm.

13. The flood protection system according to claim 1, further comprising a covering plate for covering said barrier when inside said trench in the retracted position.

14. The flood protection system according to claim 13, wherein said covering plate is further configured to cover said float when inside said depression in the retracted position and wherein said covering plate is provided with a locking mechanism configured for locking thereof and for automatically releasing thereof in response to a flood.

15. A method for protecting an area from flooding water, the method comprising:
   forming a trench at least alongside a portion of the boundaries of the area;
   forming at least one depression outside the area and adjacent said trench, on the side thereof facing away from the area;
   disposing a barrier at least partially inside said trench; and
   at least partially fitting a float coupled to said barrier within said depression;
   wherein said float is configured for rising in response to a rise in the water level inside said depression and about the boundaries of the area, and wherein said float is further configured for lifting said barrier out of said trench therewith, thereby blocking the waters from entering the area.

16. The method according to claim 15, further comprising coupling a sealing arrangement to said barrier, said sealing arrangement being configured to preclude damaging elements from entering the trench.

17. The method according to claim 16, wherein said sealing arrangement comprises an inflatable member disposed between said barrier and the trench in the retracted position, and to inflate when said barrier is in the deployed position such that sealing engagement between said barrier and a wall of the trench is maintained.

18. The method according to claim 15, further comprising mounting one or more reinforcing members on the side of the trench facing the area to be protected, said one or more reinforcing members being configured for reinforcing said barrier when in the deployed position.

19. The method according to claim 18, wherein said one or more reinforcing members are in the form of pillars upwardly disposed and mounted to the ground adjacent the trench.

* * * * *